(12) United States Patent
Coker

(10) Patent No.: US 10,499,611 B2
(45) Date of Patent: Dec. 10, 2019

(54) ADJUSTABLE CROWDING ALLEY

(71) Applicant: Michael Coker, Rosebud, TX (US)

(72) Inventor: Michael Coker, Rosebud, TX (US)

( * ) Notice: Subject to any disclaimer, the term of this patent is extended or adjusted under 35 U.S.C. 154(b) by 336 days.

(21) Appl. No.: 15/645,559

(22) Filed: Jul. 10, 2017

(65) Prior Publication Data
US 2019/0008115 A1   Jan. 10, 2019

(51) Int. Cl.
*A01K 1/00* (2006.01)
*A01K 15/04* (2006.01)

(52) U.S. Cl.
CPC ............ *A01K 1/0029* (2013.01); *A01K 15/04* (2013.01)

(58) Field of Classification Search
CPC .... A01K 15/04; A01K 1/0029; A01K 1/0023; A01K 1/0005
See application file for complete search history.

(56) References Cited

U.S. PATENT DOCUMENTS

| | | | | |
|---|---|---|---|---|
| 3,894,516 A | * | 7/1975 | Schaefer | A01K 1/0023 119/840 |
| 4,531,478 A | * | 7/1985 | Forrest | A01K 1/0613 119/752 |
| 4,854,268 A | * | 8/1989 | Kipe | A01K 1/12 119/14.03 |
| 5,111,773 A | * | 5/1992 | Akins | A01K 1/0613 119/523 |
| 6,513,459 B2 | * | 2/2003 | Linn | A01K 1/0613 119/729 |

* cited by examiner

*Primary Examiner* — Monica L Williams
(74) *Attorney, Agent, or Firm* — Rodney J. Fuller; Booth Udall Fuller, PLC

(57) ABSTRACT

An adjustable crowding alley used to route livestock or other animals towards a destination. The adjustable crowding alley includes an adjustable panel that allows the width of the alleyway to vary according to the width of the animals being routed through the adjustable crowding alley. The adjustable crowding alley includes one or more backup blockers that allow animals to move forward through the adjustable crowding alley, but restrict backwards movement of the animals within the adjustable crowding alley after passing each backup blocker.

20 Claims, 10 Drawing Sheets

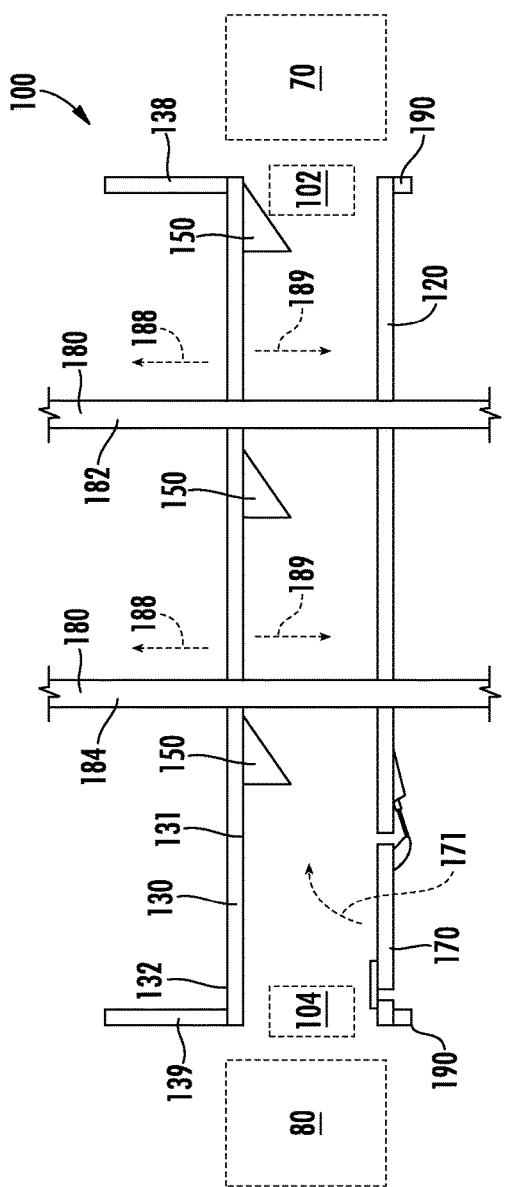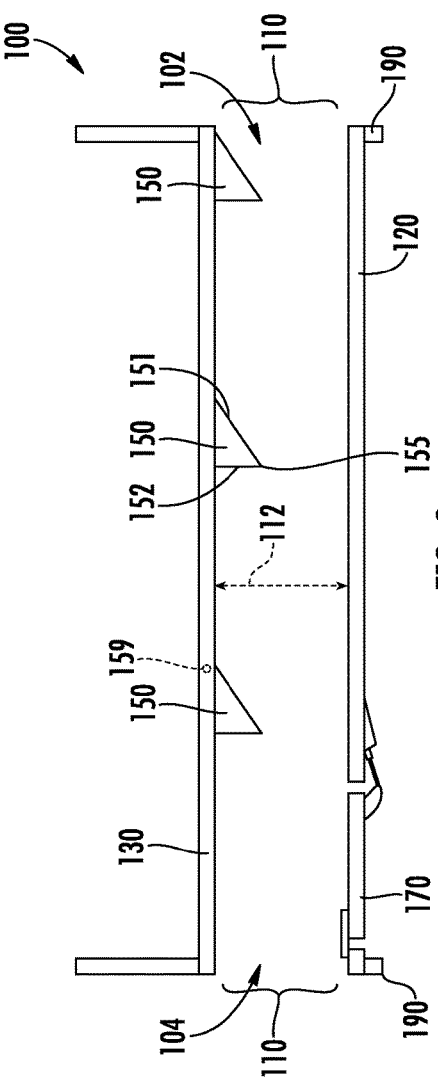
FIG. 2
FIG. 3

ADJUSTABLE CROWDING ALLEY

TECHNICAL FIELD

This disclosure relates to an adjustable crowding alley for guiding livestock or another animal from an entrance to an exit of the crowding alley. The adjustable crowding alley can adjust the width of the alleyway to accommodate different animals with different width of hips, shoulders, or torsos. The adjustable crowding alley can be employed wherever a conventional crowding alley is used with additional benefits as described herein.

BACKGROUND

Livestock or other animals may be herded and controlled in pens or holding areas. A squeeze chute is commonly used to restrict the movement of an animal to allow for veterinary care, examination, marking, or branding of the animal. Currently, conventional crowding alleys are often used to route the animals from a holding pen to the squeeze chute. Numerous problems arise when the crowding alley is too wide or too narrow for a particular animal. For example, running calves, sheep, ewes, or goats through a crowding alley sized for adult cattle leaves significant excess room around the animals within the crowding alley. Excess room within a crowding ally may allow the animals to turn around, turn to the side, climb onto adjacent animals, lay down, jump, or flip over. The risks resulting from improper movement and positioning of the animals becomes compounded because the misplaced animal can then injure adjacent animals or cause them to also become misplaced. Worse yet, redirecting or aiding a misplaced animal may require a rancher to enter the crowding alley to assist the animal. An improved system of routing animals through a crowding alley is needed to protect animals and ranchers better than the currently available crowding alleys.

SUMMARY

A need exists for an improved adjustable crowding alley. Accordingly, in an aspect, an adjustable crowding alley for guiding an animal from an entrance to an exit of the crowding alley can include: a stationary panel spanning the length of the crowding alley; a frame having a rail assembly with two or more rails, each rail being substantially perpendicular to the stationary panel; an adjustable panel substantially parallel to the stationary panel and spanning the length of the crowding alley, thereby defining an alleyway having a width W, the adjustable panel hanging from the rail assembly of the frame, wherein the width W increases or decreases as the adjustable panel moves along the two or more rails; a backup blocker movably coupled to the adjustable panel, the backup blocker comprising: a pivot assembly coupled to the adjustable panel, the pivot assembly capable of rotating around a pivot axis, the backup blocker being operable to rotate around the pivot axis between a protruding position and a collapsed position; a first face and a second face coupled at a protruding edge portion, the protruding edge portion protruding into the alleyway from a front side of the adjustable panel by at least 12 cm when the backup blocker is in the protruding position; and a spring assembly biased to hold the backup blocker in the protruding position and biased to resist movement of the backup blocker around the pivot axis into the collapsed position, wherein forces applied normal to the first face rotate the backup blocker around the pivot axis but forces applied normal to the second face do not rotate the backup blocker around the pivot axis; a control assembly operable to control the movement of the adjustable panel along the two or more rails; and a gate pivotally coupled to the stationary panel proximate the exit of the crowding alley, the gate being substantially parallel to the stationary panel in a closed position and the gate opening into the alleyway towards the adjustable panel in an open position.

In some aspects, the adjustable panel is capable of moving along the two or more rails to vary the width W between a first alleyway width $W_1$ and a third alleyway width $W_3$ with a second alleyway width $W_2$ being between $W_1$ and $W_3$, wherein $W_2$ is from 35 cm to 150 cm.

In certain aspects, the adjustable crowding alley for guiding an animal from an entrance to an exit of the crowding alley can further include: a rear side of the adjustable panel opposite the front side of the adjustable panel; a first end portion of the adjustable panel proximate the entrance of the crowding alley; a second end portion of the adjustable panel proximate the exit of the crowding alley; and a first barrier coupled to the first end portion of the adjustable panel, the first barrier protruding away from the rear side of the adjustable panel by a distance between $1.5 \cdot (W_2 - W_1)$ and $1.0 \cdot (W_2 - W_1)$, wherein $W_1$ is from 20 cm to 50 cm and $W_2$ is from 60 cm to 125 cm, the first barrier thereby operable to resist entry of the animal from the entrance of the of the crowding alley to the rear side of the adjustable panel.

In an aspect, an adjustable crowding alley for guiding an animal from an entrance to an exit of the crowding alley can include: a stationary panel spanning the length of the crowding alley; an adjustable panel positioned opposite to the stationary panel and spanning a length $L_{total}$ from the entrance to the exit of the crowding alley, thereby defining an alleyway having a width W, the adjustable panel hanging from a rail assembly having two or more rails, wherein the width W increases or decreases as the adjustable panel moves along the two or more rails; and a plurality of backup blockers movably coupled to the adjustable panel, each of the backup blockers comprising: a pivot assembly coupled to the adjustable panel, the pivot assembly capable of rotating around a pivot axis, the backup blocker being operable to rotate around the pivot axis between a protruding position and a collapsed position; a first face and a second face coupled at a protruding edge portion, the protruding edge portion protruding into the alleyway from a front side of the adjustable panel by at least 12 cm when the backup blocker is in the protruding position; and a spring assembly biased to hold the backup blocker in the protruding position and biased to resist movement of the backup blocker around the pivot axis into the collapsed position, wherein forces applied normal to the first face rotate the backup blocker around the pivot axis but forces applied normal to the second face do not rotate the backup blocker around the pivot axis; wherein the distance between adjacent protruding edge portions of each of the plurality of backup blockers is a first length $L_1$.

In certain aspects, the first length $L_1$ is between 150 cm and 300 cm. In some aspects, the first length $L_1$ is between 150 cm and 300 cm and the plurality of backup blockers consists of two to five backup blockers; or the first length $L_1$ is between 100 cm and 170 cm and the plurality of backup blockers consists of two to eight backup blockers.

In certain aspects, the adjustable crowding alley for guiding an animal from an entrance to an exit of the crowding alley can further include: a gate pivotally coupled to the stationary panel proximate the exit of the crowding alley, the gate being substantially parallel to the stationary panel in a closed position and the gate opening into the alleyway towards the adjustable panel in an open position.

In some aspects, the adjustable crowding alley for guiding an animal from an entrance to an exit of the crowding alley can further include: a first control assembly operable to hydraulically control the movement of the adjustable panel along the two or more rails, the first control assembly being positioned within 200 cm of the entrance of the crowing alley; and a second control assembly operable to hydraulically control the movement of the adjustable panel along the two or more rails, the second control assembly being positioned within 200 cm of the exit of the crowing alley, wherein the same movement of the adjustable panel is controlled by at least one control member of the first control assembly and by at least one control member of the second control assembly.

In some aspects, the length $L_{total}$ is between 7.5 and 12 m. In some aspects, the adjustable panel is capable of moving along the two or more rails to vary the width W between a first alleyway width $W_1$ and a third alleyway width $W_3$ with a second alleyway width $W_2$ being between $W_1$ and $W_3$, wherein $W_2$ is from 36 cm to 150 cm.

In certain aspects, the adjustable crowding alley for guiding an animal from an entrance to an exit of the crowding alley can further include: a rear side of the adjustable panel opposite the front side of the adjustable panel; a first end portion of the adjustable panel proximate the entrance of the crowding alley; a second end portion of the adjustable panel proximate the exit of the crowding alley; and a first barrier coupled to the first end portion of the adjustable panel, the first barrier protruding away from the rear side of the adjustable panel by a distance between $1.5 \cdot (W_2 - W_1)$ and $1.0 \cdot (W_2 - W_1)$, wherein $W_1$ is from 20 cm to 50 cm and $W_2$ is from 60 cm to 125 cm, the first barrier thereby operable to resist entry of the animal from the entrance of the of the crowding alley to the rear side of the adjustable panel.

In some aspects, $W_3$ is at least 60 cm wider than $W_2$.

In an aspect, an adjustable crowding alley for guiding an animal from an entrance to an exit of the crowding alley can include: an adjustable panel spanning a length $L_{total}$ from the entrance to the exit of the crowding alley, the adjustable panel being capable of being positioned substantially parallel to a stationary panel and thereby defining an alleyway having a width W, the adjustable panel hanging from a rail assembly having two or more rails, wherein the width W increases or decreases as the adjustable panel moves along the two or more rails; and a plurality of backup blockers movably coupled to the adjustable panel, each of the backup blockers comprising: a pivot assembly coupled to the adjustable panel, the pivot assembly capable of rotating around a pivot axis, the backup blocker being operable to rotate around the pivot axis between a protruding position and a collapsed position; a first face and a second face coupled at a protruding edge portion, the protruding edge portion protruding into the alleyway from a front side of the adjustable panel by at least 12 cm when the backup blocker is in the protruding position; and a spring assembly biased to hold the backup blocker in the protruding position and biased to resist movement of the backup blocker around the pivot axis into the collapsed position, wherein forces applied normal to the first face rotate the backup blocker around the pivot axis but forces applied normal to the second face do not rotate the backup blocker around the pivot axis; wherein the distance between adjacent protruding edge portions of each of the plurality of backup blockers is a first length $L_1$ measuring at least 100 cm.

In some aspects, the adjustable panel is capable of moving along the two or more rails to vary the width W between a first alleyway width $W_1$ and a third alleyway width $W_3$ with a second alleyway width $W_2$ being between $W_1$ and $W_3$. In certain aspects, $W_3$ is at least 60 cm wider than $W_2$. In some aspects, the first length $L_1$ is between 150 cm and 300 cm. In some aspects, the first length $L_1$ is between 150 cm and 300 cm and the plurality of backup blockers consists of two to five backup blockers; or the first length $L_1$ is between 100 cm and 170 cm and the plurality of backup blockers consists of two to eight backup blockers.

In certain aspects, the adjustable crowding alley for guiding an animal from an entrance to an exit of the crowding alley can further include: a rear side of the adjustable panel opposite the front side of the adjustable panel; a first end portion of the adjustable panel proximate the entrance of the crowding alley; a second end portion of the adjustable panel proximate the exit of the crowding alley; and a first barrier coupled to the first end portion of the adjustable panel, the first barrier protruding away from the rear side of the adjustable panel by a distance between $1.5 \cdot (W_2 - W_1)$ and $1.0 \cdot (W_2 - W_1)$, wherein $W_1$ is from 20 cm to 50 cm and $W_2$ is from 60 cm to 125 cm, the first barrier thereby operable to resist entry of the animal from the entrance of the of the crowding alley to the rear side of the adjustable panel.

In certain aspects, the adjustable crowding alley for guiding an animal from an entrance to an exit of the crowding alley can further include: a stationary panel spanning the length of the crowding alley, the stationary panel having a gate proximate the exit of the crowding alley, wherein the gate is a palpation gate.

In certain aspects, the adjustable crowding alley for guiding an animal from an entrance to an exit of the crowding alley can further include: a first control assembly operable to hydraulically control the movement of the adjustable panel along the two or more rails, the first control assembly being positioned within 200 cm of the entrance of the crowing alley; and a second control assembly operable to hydraulically control the movement of the adjustable panel along the two or more rails, the second control assembly being positioned within 200 cm of the exit of the crowing alley, wherein the same movement of the adjustable panel is controlled by at least one control member of the first control assembly and by at least one control member of the second control assembly.

Aspects and applications of the disclosure are described below with reference to the DRAWINGS and the DETAILED DESCRIPTION. Unless specifically noted, the words and phrases in the specification and the claims should be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly comprise additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

BRIEF DESCRIPTION OF THE DRAWINGS

FIGS. 2-7 show various non-limiting examples of plan views of an adjustable crowding alley.

DETAILED DESCRIPTION

Figure 1:
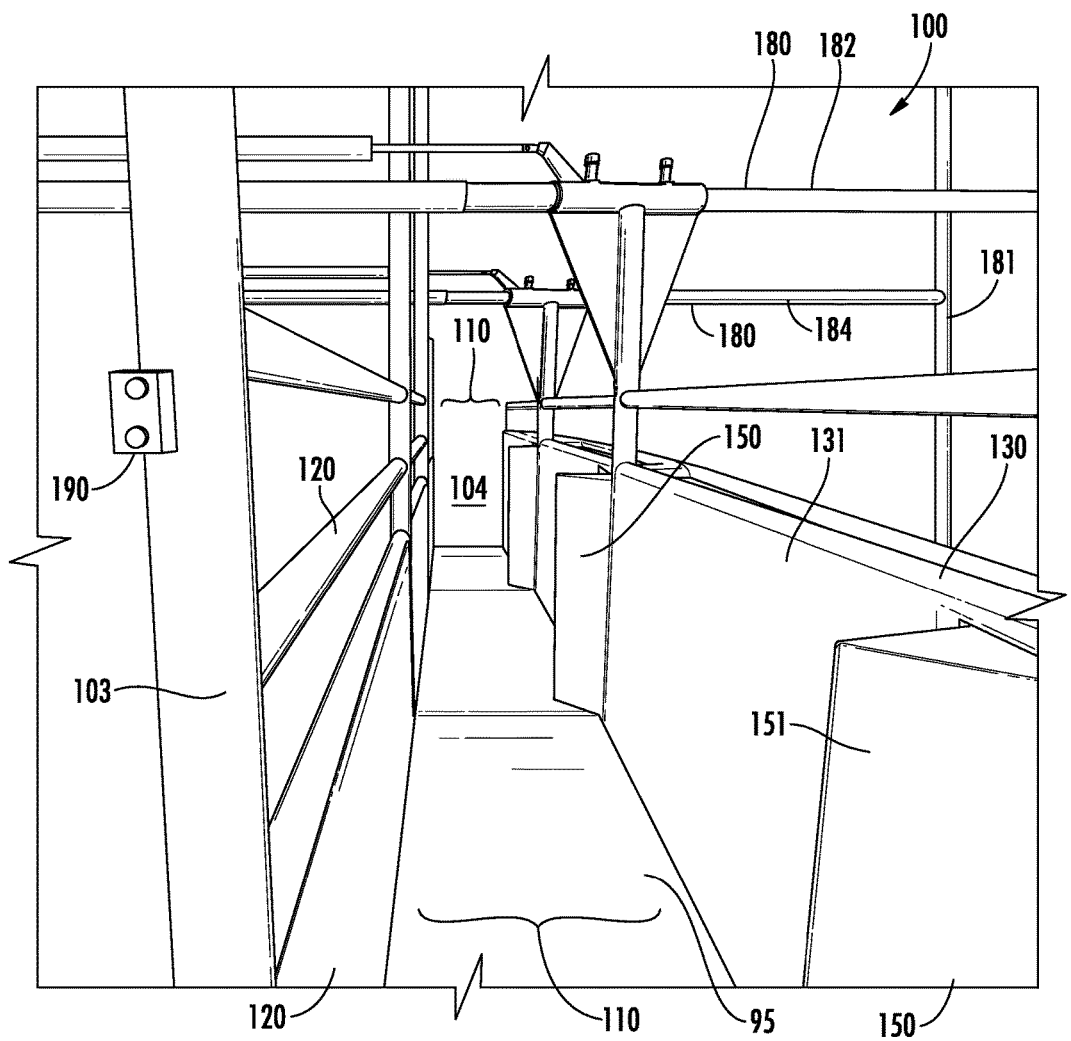
FIG. 1 shows a non-limiting example of a perspective view of an adjustable crowding alley.
Figure 4:
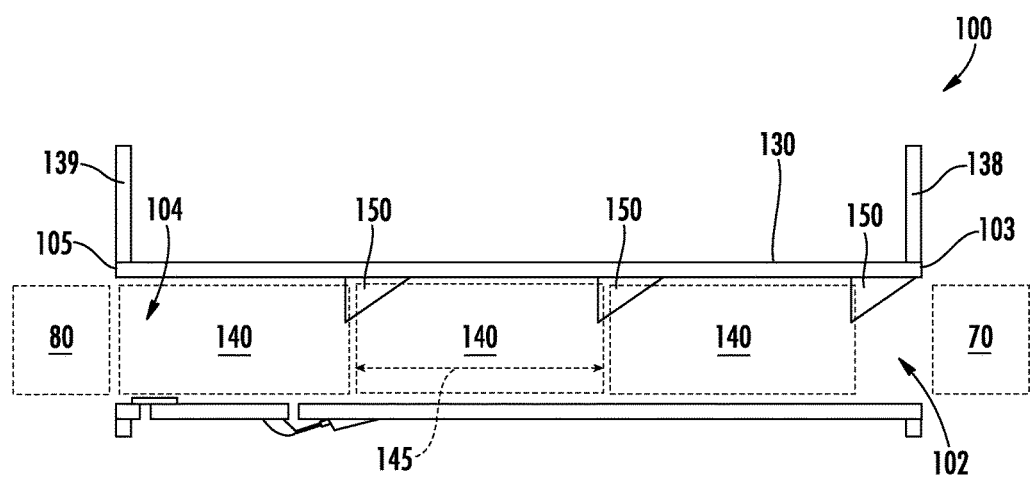
Figure 5:
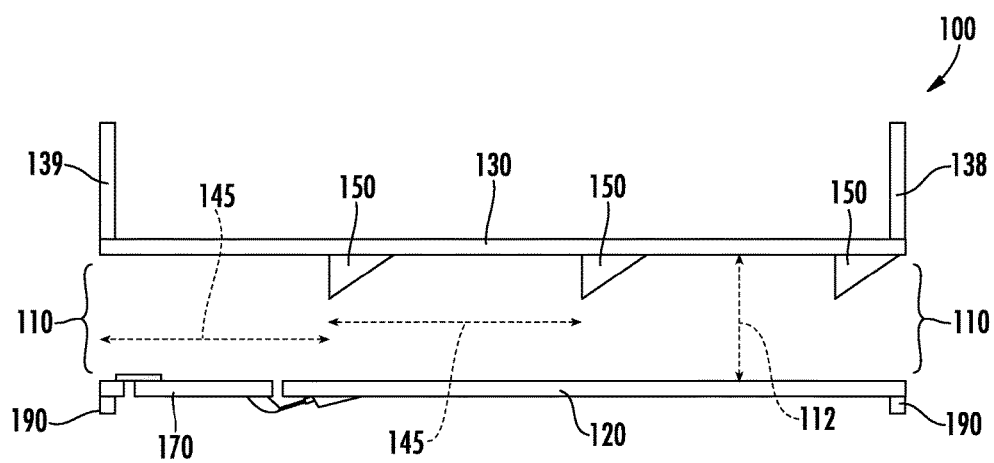

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The words "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes embodiments of many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

FIG. 1 shows a non-limiting example of a perspective view of an adjustable crowding alley 100. Adjustable crowding alley 100 may be used to route livestock (e.g., cattle, sheep, pigs, etc.) or other animals (e.g., horses, deer, elk, antelope, etc.) from an entrance 102 (see FIG. 2) to an exit 104 of the adjustable crowding alley 100. The adjustable crowding alley 100 includes a stationary panel 120 and an adjustable panel 130 with a space or void between panels 120 and 130 for the animals to pass through, and this space or void between panels 120 and 130 is referred to herein as alleyway 110. The adjustable panel 130 hangs from a rail assembly 180 (e.g., a frame 181 having a rail assembly 180) instead of supporting the majority of the weight of the adjustable panel 130 through the floor 95 beneath the adjustable crowding alley 100. In some implementations, the entire weight of the adjustable panel 130 is supported by the rail assembly 180 and/or the adjustable panel 130 does not directly contact the floor 95. The adjustable panel 130 includes at least one moveable backup preventer or backup blocker 150 that is spring loaded or otherwise biased to protrude into the alleyway 110. The adjustable crowding alley 100 confines animals as they move forward (i.e., from entrance 102 towards exit 104) and restricts animal movement in the reverse direction (i.e., back towards the entrance 102). As an animal presses against a forward face 151 the backup blocker 150 collapses into the front face 131 of the adjustable panel 130 and then springs back out to the protruding position after the pressure is removed from the forward face 151 (e.g., the animal has moved in front of the backup blocker 150). If the animal leans against or otherwise puts pressure on the reverse face 152 (see FIG. 2) of the backup blocker 150, the backup blocker 150 does not collapse into the adjustable panel 130 and therefore helps to restrict or prevent the animal from backing up after the animal has passed a backup blocker 150.

FIGS. 2-11 show non-limiting examples of perspective and plan views of an adjustable crowding alley 100 used to route animals from an animal source 70 positioned at the entrance 102 to an animal destination 80 positioned at the exit 104. The rail assembly 180 is depicted in FIG. 2, but omitted from FIGS. 3-7 to improve visibility of alleyway 110, the stationary panel 120, and the adjustable panel 130. Additionally, FIGS. 6-11 show non-limiting examples of perspective and plan views of an adjustable crowding alley 100 used to route animals from a crowd pen 72 positioned at the entrance 102 to a squeeze chute 82 positioned at the exit 104. The adjustable crowding alley 100 may be used to route animals from numerous different sources 70 towards numerous different destinations 80, and is not limited in any way to the examples of a crowd pen 72 and a squeeze chute 82. The adjustable crowding alley 100 may be used to route animals from numerous different sources 70 towards numerous different destinations 80. The destination 80 may be, for example, a ramp and truck, a pen, a chute, a squeeze chute, a gangway, a feeding stall, a milking station, a building, a cage, a transportation unit, or any other target destination currently available or yet to be developed where animals are desired to be routed towards. The source 70 may be, for example, a ramp and truck, a pen, an alleyway, a crowding alley, a chute, a squeeze chute, a gangway, a field, a building, a cage, a transportation unit, or any other source of animals currently available or yet to be developed where animals are desired to be routed or corralled from.

In some implementations the adjustable panel 130 moves along the rail assembly 180 using rail hydraulics 185. Rail hydraulics 185 may be engaged, disengaged, or otherwise controlled from one or more controller assemblies 190. A controller assembly 190 includes buttons, levers, valves, or the like for controlling whether the rail assembly 180 becomes engaged and thereby moves the adjustable panel 130 along the rail assembly 180. In some implementations two control assemblies 190 are used: an entrance control assembly 191 (e.g., positioned near the entrance edge 103) and an exit control assembly 192 (e.g., positioned near one or both of the exit edge 105 and the gate 170). Preferably the one or more controller assemblies 190 are located within reach (e.g., less than 150 cm from the exit 104 or entrance 102) or within a step or two away (e.g., less than 250 cm from the exit 104 or entrance 102) of the rancher while the rancher helps route the animals through the adjustable crowding alley 100.

The alleyway 110 has a width 112, which is adjustable because the adjustable panel 130 moves along the rail assembly 180 to expand or contract width 112 (see expansion direction 188 and contraction direction 189 in FIG. 2). Thus, the width 112 of alleyway 110 may range from a minimum width $W_{min}$ 113 out to a maximum width $W_{max}$ 116 with a maximum crowding width $W_{max\_c}$ 115 between $W_{min}$ 113 and $W_{max}$ 116 (i.e., $W_{min}$ 113<$W_{max\_c}$ 115<$W_{max}$ 116). The adjustable panel 130 moves along rail assembly 180 to adjust width 112 to operate at an operating width $W_{opr}$ 114. For example, a rancher can use the control assembly 190 to set the operating width $W_{opr}$ 114 to provide a snug alleyway 110 for young calves and may then widen the operating width $W_{opr}$ 114 to provide a snug alleyway 110 for large bulls or other adult cattle. The operating width $W_{opr}$ 114 corresponds to a width of an animal desired to pass through alleyway 110, so operating width $W_{opr}$ 114 for a narrow animal (e.g., goats or deer) will be smaller than operating width $W_{opr}$ 114 for a wider animal (e.g., cattle or horses). The operating width $W_{opr}$ 114 may range anywhere from the minimum width $W_{min}$ 113 to the maximum crowding width $W_{max\_c}$ 115 (i.e., $W_{min}$ 113<$W_{opr}$ 114<$W_{max\_c}$ 115). In some implementations, the width 112 of the alleyway 110 may be expanded (e.g., by moving the adjustable panel 130) so that the maximum width $W_{max}$ 116 is at least 1.5 to 5 times as wide as conventional alleyways for beef or dairy cattle.

The non-limiting examples of an adjustable crowding alley 100 shown in FIGS. 2-11 illustrate example implementations of an adjustable crowding alley 100 including three backup blockers 150. In alternative implementations of the adjustable crowding alley 100, fewer (e.g., 1 or 2) or more (e.g., 4-5, 4-8, 4-15, etc.) backup blockers 150 are included in the adjustable crowding alley 100. The alleyway 110 is divided into one or more generally rectangular sections 140 with each section 140 having a width of the alleyway width 112 and a length referred to herein as a section length $L_s$ 145. The section length $L_s$ 145 is related to the length of the routed animal (e.g., nose to rear, sternum to rear, or other animal length) because the section length $L_s$ 145 is capable of housing the routed animal within the section length $L_s$ 145. Depending on the implementation, the section length $L_s$ 145 may be measured from one or more of the following distances: from one backup blocker 150 to an adjacent backup blocker 150; from one extended backup blocker 150 to an adjacent and extended backup blocker 150; from the protruding edge 155 of a backup blocker 150 to another protruding edge 155 of another backup blocker 150; from a backup blocker 150 to the exit edge 105; or from a protruding edge 155 of a backup blocker 150 to the exit edge 105.

In some implementations, a section length $L_s$ 145 is long enough to fit only one animal. In alternative implementations, a section length $L_s$ 145 is long enough to fit two or more animals end to end. In some implementations, a section length $L_s$ 145 is long enough to fit only one large animal (e.g., a cow), but will fit two or more smaller animals (e.g., sheep) end to end. In some implementations, $W_{opr}$ 114 ranges from 20 cm to 170 cm (e.g., 30-160 cm, 35-150 cm, 40-120 cm, 35-100 cm, 45-130 cm, etc.) and accommodates the width of various different animals (e.g., different species, breeds, or genders). In some implementations, $W_{max\_c}$ 115 ranges from 35 cm to 200 cm (e.g., 35-180 cm, 35-150 cm, 40-170 cm, 35-130 cm, 50-175 cm, etc.) and accommodates the width of various different animals (e.g., different species, breeds, or genders).

Table 1 below lists non-limiting examples of various lengths for $L_s$ 145 and different widths for the various parameters of width 112 (i.e., $W_{min}$ 113, $W_{opr}$ 114, $W_{max\_c}$ 115, and $W_{max}$ 116). Table 1 lists sample ranges for five different animals:

a large cow with a length (nose to rear) of 245 cm and a width of 75 cm; a medium cow with a length (nose to rear) of 220 cm and a width of 60 cm; a small cow with a length (nose to rear) of 190 cm and a width of 50 cm; a goat with a length (nose to rear) of 140 cm and a width of 40 cm; and a sheep with a length (nose to rear) of 130 cm and a width of 45 cm. Table 1 also lists sample ranges of section length $L_s$ 145 for a single animal and two animals end to end (see column labeled "Double").

TABLE 1

| Animal L × W (cm) | Single $L_s$ 145 (cm) | Double $L_s$ 145 (cm) | $W_{min}$ 113 (cm) | $W_{opr}$ 114 (cm) | $W_{max\_c}$ 115 (cm) | $W_{max}$ 116 (cm) |
|---|---|---|---|---|---|---|
| Large Cattle | 245 × 75 | 250-350 | 550-700 | 10-55 | 75-95 | 80-120 | 180-350 |
| Medium Cattle | 220 × 60 | 225-310 | 450-650 | 10-45 | 60-80 | 70-120 | 150-350 |
| Small Cattle | 190 × 50 | 195-300 | 390-600 | 10-40 | 50-70 | 60-100 | 130-350 |
| Goat | 140 × 40 | 145-275 | 290-500 | 10-30 | 40-60 | 50-115 | 100-300 |
| Sheep | 130 × 45 | 135-260 | 270-425 | 10-35 | 45-65 | 50-120 | 110-320 |

The length of section length $L_s$ 145 and the width of the operating width $W_{opr}$ 114 are the two measurements that are most closely tied to size of the animals being routed through the adjustable crowding alley 100 because excess or insufficient length for $L_s$ 145 or width for $W_{opr}$ 114 can create risks to animals or ranchers. If the operating width $W_{opr}$ 114 is too narrow, the width of the animal will not fit within the operating width $W_{opr}$ 114. If the operating width $W_{opr}$ 114 is too wide, the excess room around the width of the animal may allow the animal to: turn around, lay down, buck, rear, or to crowd, kick, or climb on another animal within the same section 140. If the section length $L_s$ 145 is too short, the length of the animal will not fit within the section length $L_s$ 145. If the section length $L_s$ 145 is too long, the animal may have too much free forward or reverse movement and possibly crowd, kick, or climb on another animal within the same section 140. Having excess length in the section length $L_s$ 145 is not as problematic if the operating width $W_{opr}$ 114 provides a tight and snug fit against the width of the animal. In some implementations, the operating width $W_{opr}$ 114 is larger than the width of the intended animal(s) by a factor where $W_{opr}$ 114=(factor)×(animal length) and the factor ranges from: 1.01 to 1.25; 1.01 to 1.20; 1.01 to 1.14; or preferably 1.05 to 1.10. In some implementations, the section length $L_s$ 145 is longer than the length of the intended animal(s) by a factor where $L_s$ 145=(factor)×(animal length)

and the factor ranges from: 1.01 to 1.65; 1.01 to 1.35; 1.05 to 1.25; 1.1 to 1.4; or preferably 1.05 to 1.20. In some implementations, the length of the section length $L_s$ 145 is determined by the longest animal intended to be routed by the adjustable crowding alley 100.

In contrast to $L_s$ 145 and $W_{opr}$ 114, the minimum width $W_{min}$ 113, the maximum crowding width $W_{max\_c}$ 115, and the maximum width $W_{max}$ 116 are less of a function of the size of the intended animals and are more a function of the space available for building the adjustable crowding alley 100. In some implementations, the minimum width $W_{min}$ 113 is from: 10-60 cm, 10-50 cm, 20-45 cm, 15-40 cm, 25-50 cm, 40-45 cm, or 30-40 cm. In some implementations, the maximum crowding width $W_{max\_c}$ 115 is from: 60-150 cm, 80-120 cm, 80-100 cm, 50-120 cm, 70-150 cm, 50-80 cm, 70-90 cm, or 60-110 cm. In some implementations, the maximum width $W_{max}$ 116 is from: 100-400 cm, 150-350 cm, 100-300 cm, 150-350 cm, 100-200 cm, 125-250 cm, or 125-180 cm.

Figure 7:
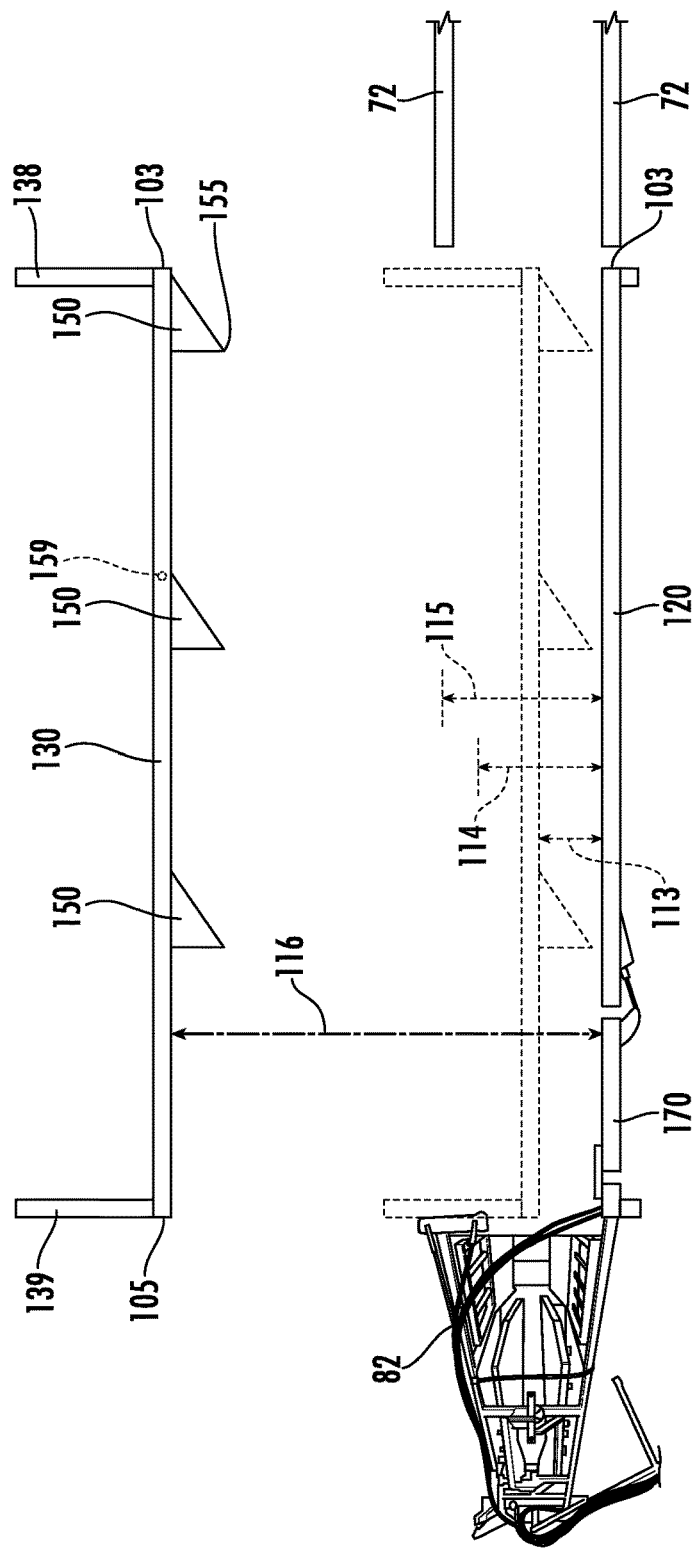
Figure 8:
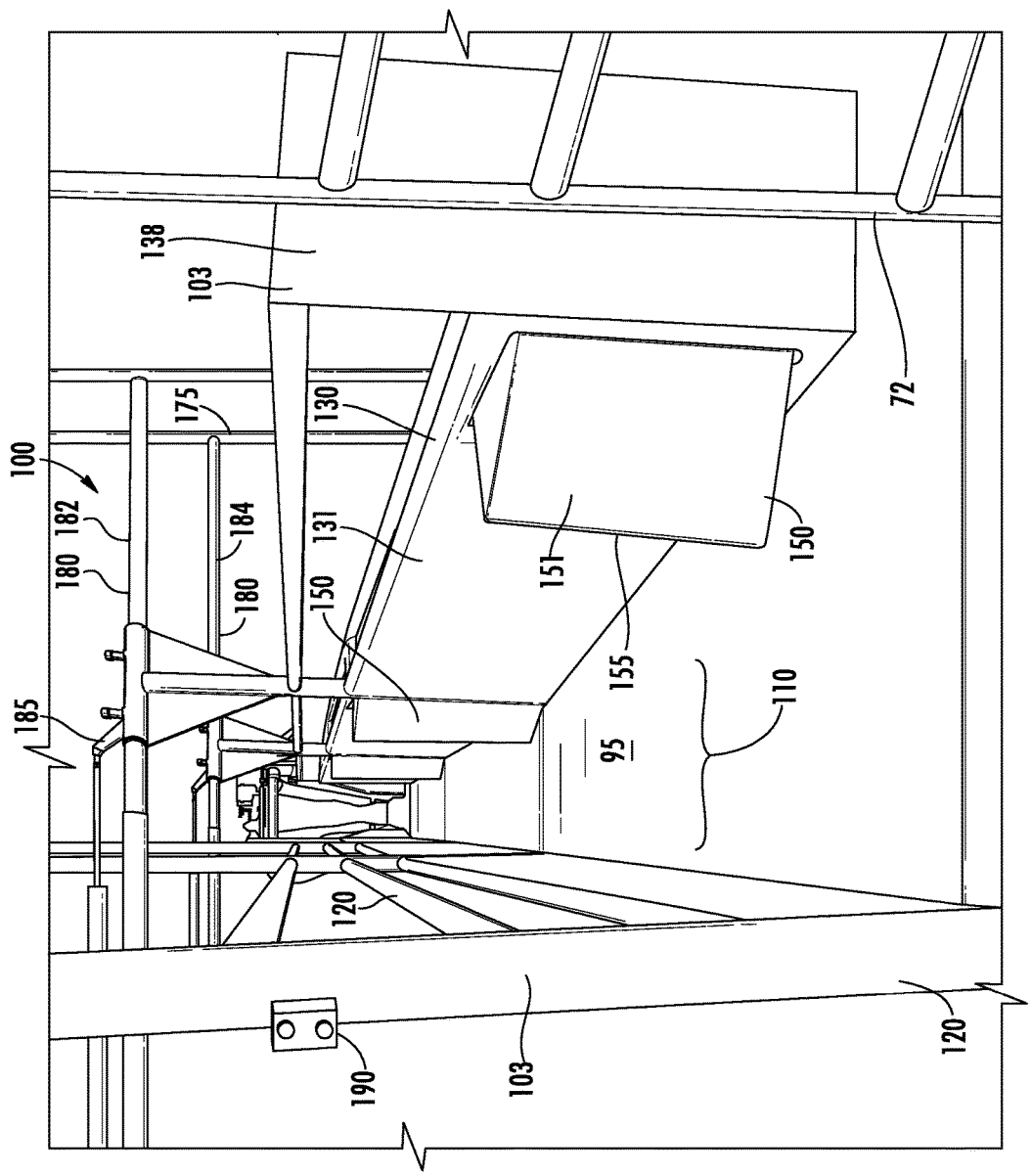
FIGS. 8-10 show various non-limiting examples of perspective views of an adjustable crowding alley.
Figure 9:
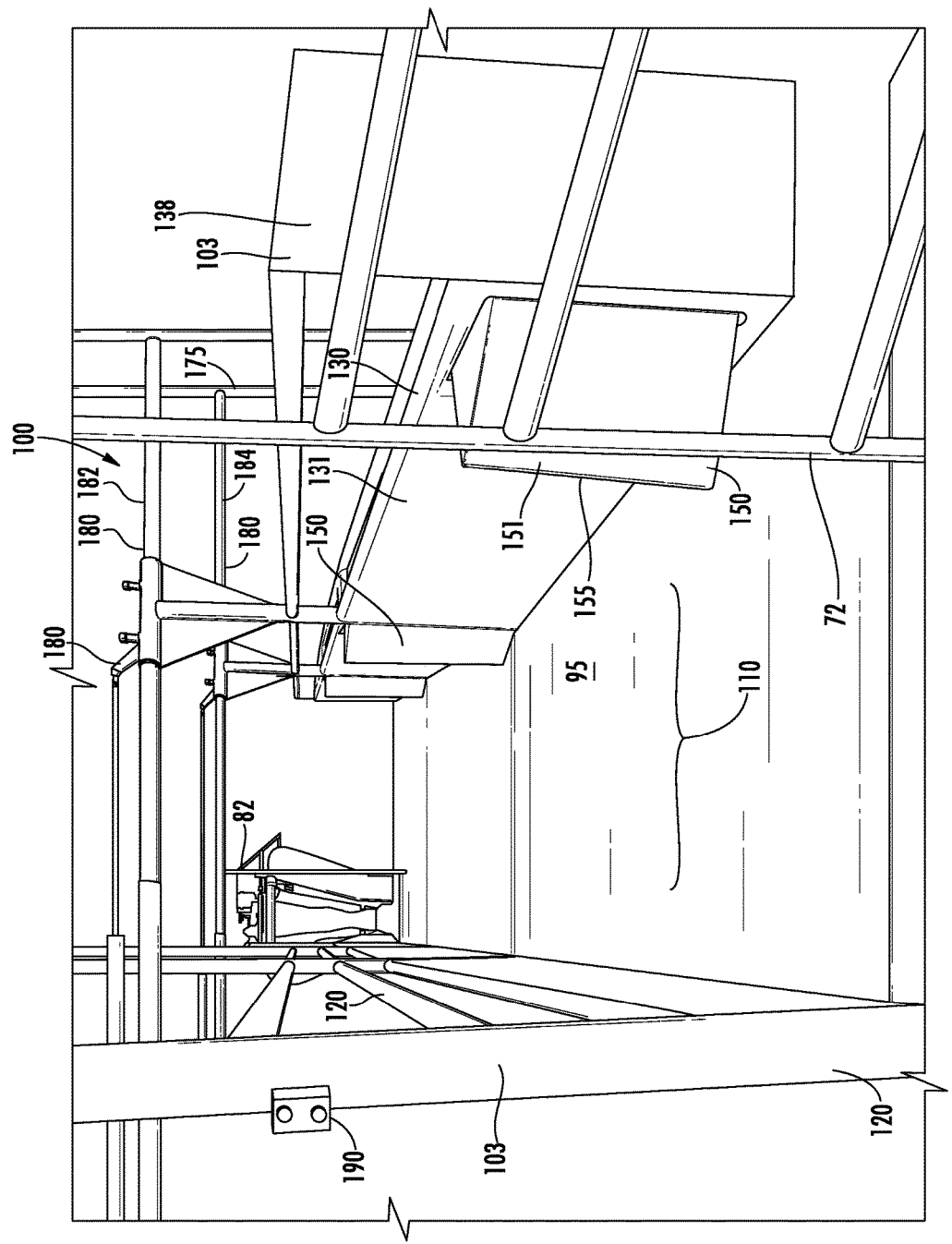

Referring to FIGS. 7-9, expanding or contracting the width 112 of alleyway 110 allows various advantages above and beyond accommodating animals of varying widths. The adjustable panel 130 may include a front barrier 138 and/or a rear barrier 139, which present a barrier to prevent animals from avoiding the alleyway 110 and walking by the rear face 132 instead of the front face 131 of the adjustable panel 130. For example, the front barrier 138 (and optionally the rear barrier 139) is/are sufficiently long so that it provides a barrier when the width 112 is set to any operating width $W_{opr}$ 114 ranging from $W_{min}$ 113 to $W_{max\_c}$ 115. In some implementations, one or both of the front barrier 138 and rear barrier 139 has a width equal to a factor multiplied by the difference between the maximum crowding width $W_{max\_c}$ 115 and the minimum width $W_{min}$ 113 (i.e., barrier width=factor·($W_{max\_c}$ 115–$W_{min}$ 113)) where the factor ranges from: 0.8-5.0, 0.8-4.0, 0.8-3.2, 1.0-3.5, 1.0-2.4, 1.0-1.5, or 1.2-2.4. In some implementations, one or both of the front barrier 138 and rear barrier 139 has a width that ranges from: 20-140 cm, 20-105 cm, 25-120 cm, 25-180 cm, 25-95 cm, or 30-90 cm.

FIGS. 7 and 9 illustrate that opening up the adjustable panel 130 to be wider than one or both of the operating width $W_{opr}$ 114 and the maximum crowding width $W_{max\_c}$ 115 provides an access to the alleyway 110 from outside the source 70 or the destination 80. This access route is helpful because it allows a rancher to rescue or otherwise access or aid an animal within the alleyway 110. Current crowding alleys do not conveniently provide this access route and typically require a rancher to jump into the tight crowding alley with a large and powerful animal.

Figure 6:
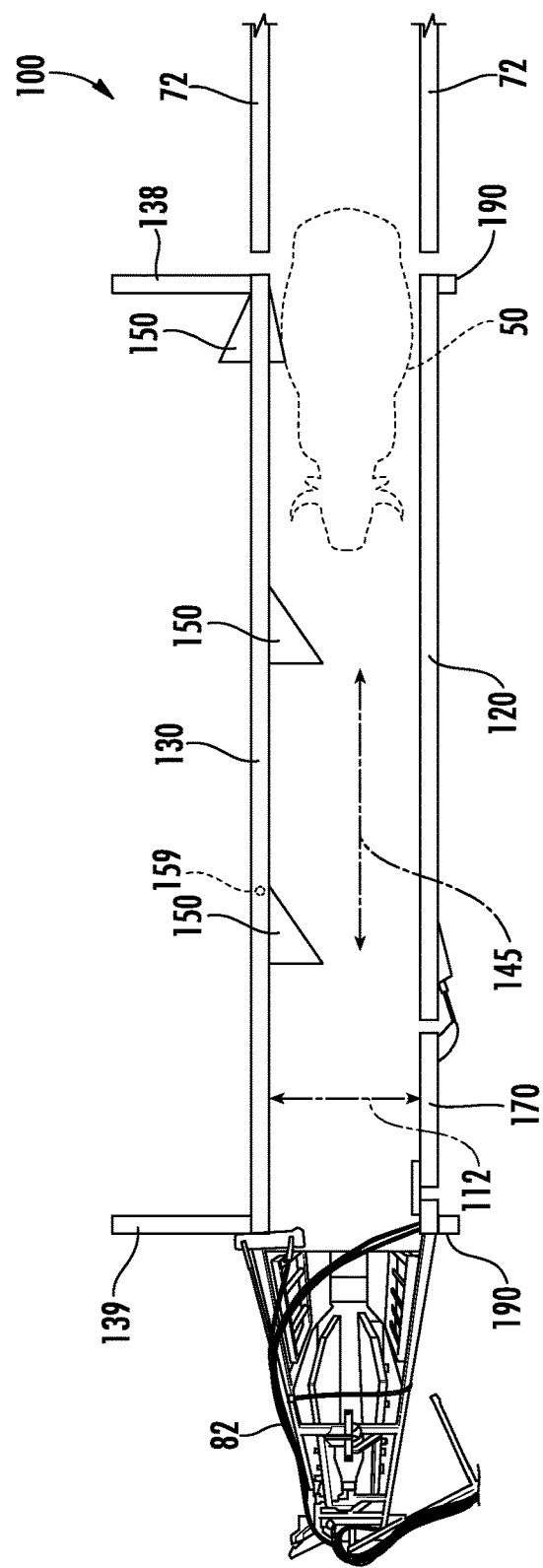
Figure 10:
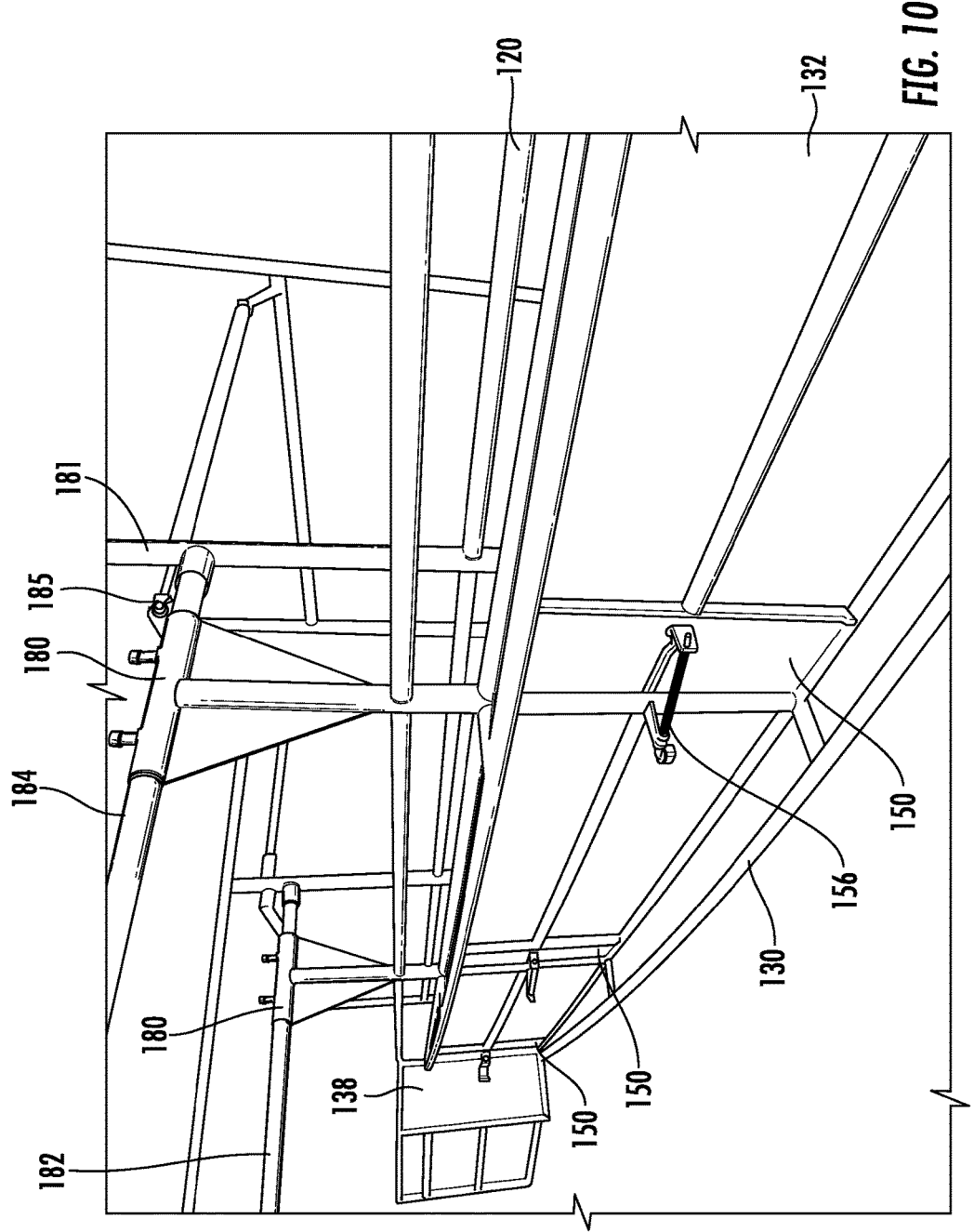
Figure 11:
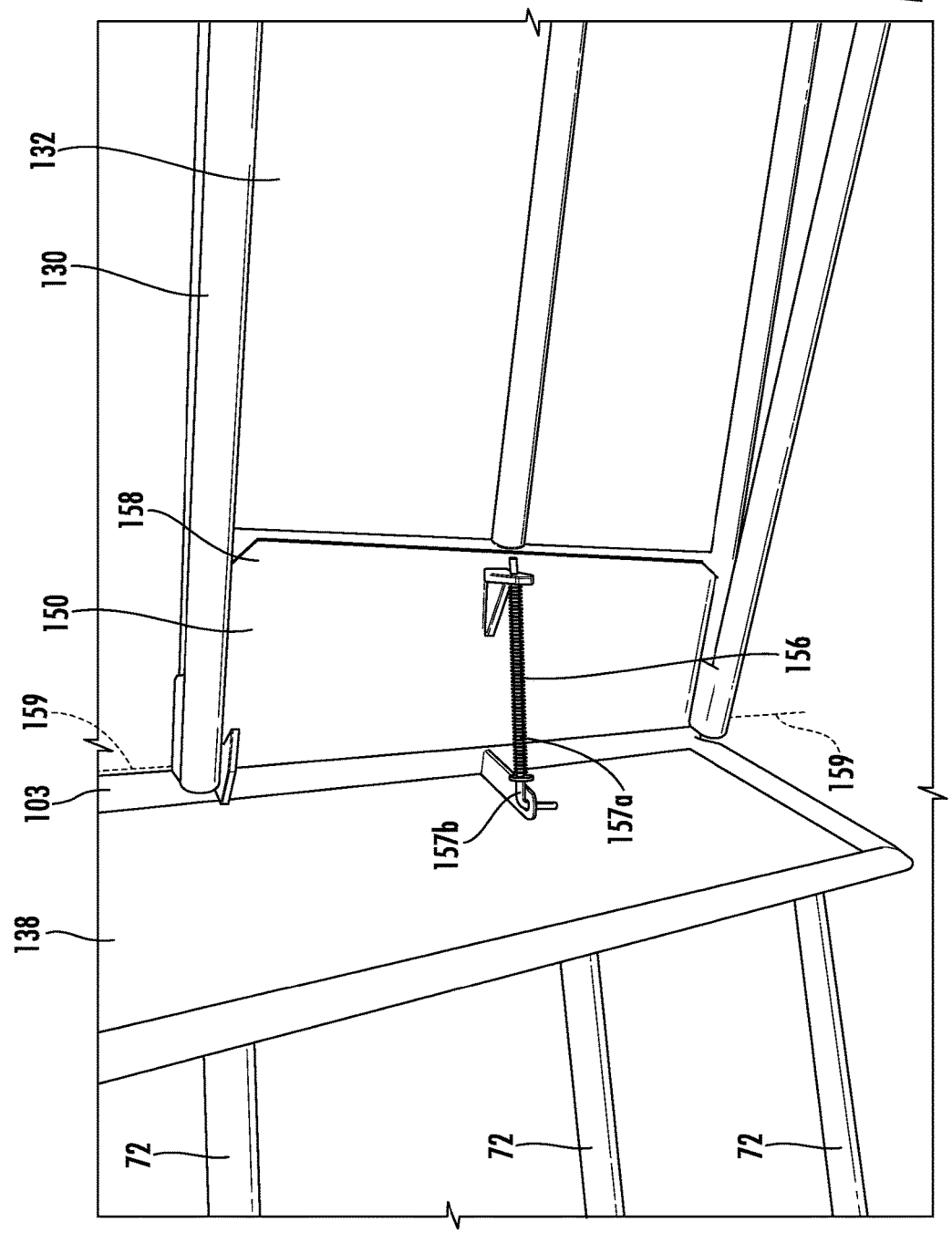
FIG. 11 shows a detailed perspective view of a non-limiting example of a backup blocker.

FIGS. 10 and 11 show non-limiting examples of the rear face 132 of the adjustable panel 130 to view the rear side of the backup blockers 150. The backup blocker 150 is spring-loaded and able to collapse into and/or towards the front face 131 of the adjustable panel 130 by rotating around pivot axis 159 as an animal exerts pressure against the forward face 151 of the backup blocker 150. The animal continues to compress the backup blocker 150 with their shoulder, side, and hips as the animal moves forward (see FIG. 6 depicting an example of a compressed backup blocker 150 collapsed into front face 131 by the side of an animal 50). After the rear end of the animal pushes past the protruding edge 155 of the backup blocker 150 there is no more pressure from the animal's side on the forward face 151, so the spring-loaded backup blocker 150 returns to its original protruding position jutting out into the alleyway 110 (e.g., using a spring assembly 156 coupled to the backup blocker 150). A spring assembly 156 may include a spring 157a and bar 157b that provide bias to keep the protruding edge 155 of the backup blocker 150 in the default position extending into the alleyway and provide resistance to being compressed towards the front face 131. A lip 158 may be used in some implementations to press against the rear face 132 to prevent the spring assembly 156 from pushing the backup blocker 150 beyond the default biased position. In some implementations a spring assembly 156: provides the bias to cause the default position of the protruding edge 155 jutting into alleyway 110; provides resistance to forces against forward face 151; and returns the backup blocker 150 to the default position when force against the forward face 151 is removed or sufficiently lowered.

In some implementations the protruding edge 155 of the backup blocker 150 protrudes out into the alleyway 110 away from the front face 131 of the adjustable panel 130 (when in the default/biased position) by: 8-40 cm, 8-30 cm, 8-22 cm, 10-25 cm, 10-18 cm, or at least 10 cm, 12 cm, or 15 cm. The backup blocker 150 pivots around the pivot axis 159 to collapse into the front face 131 when force is applied to the forward face 151. However, forces applied to the reverse face 152 of the backup blocker 150 (e.g., the rear of an animal pushing on the reverse face 152) do not cause the backup blocker 150 to pivot around the axis, and thus the backup blocker 150 does not collapse under these forces. Accordingly, each backup blocker 150 allows an animal to pass, but restricts or prevents rearward movement by not collapsing under rearward pressure.

Figure 12:
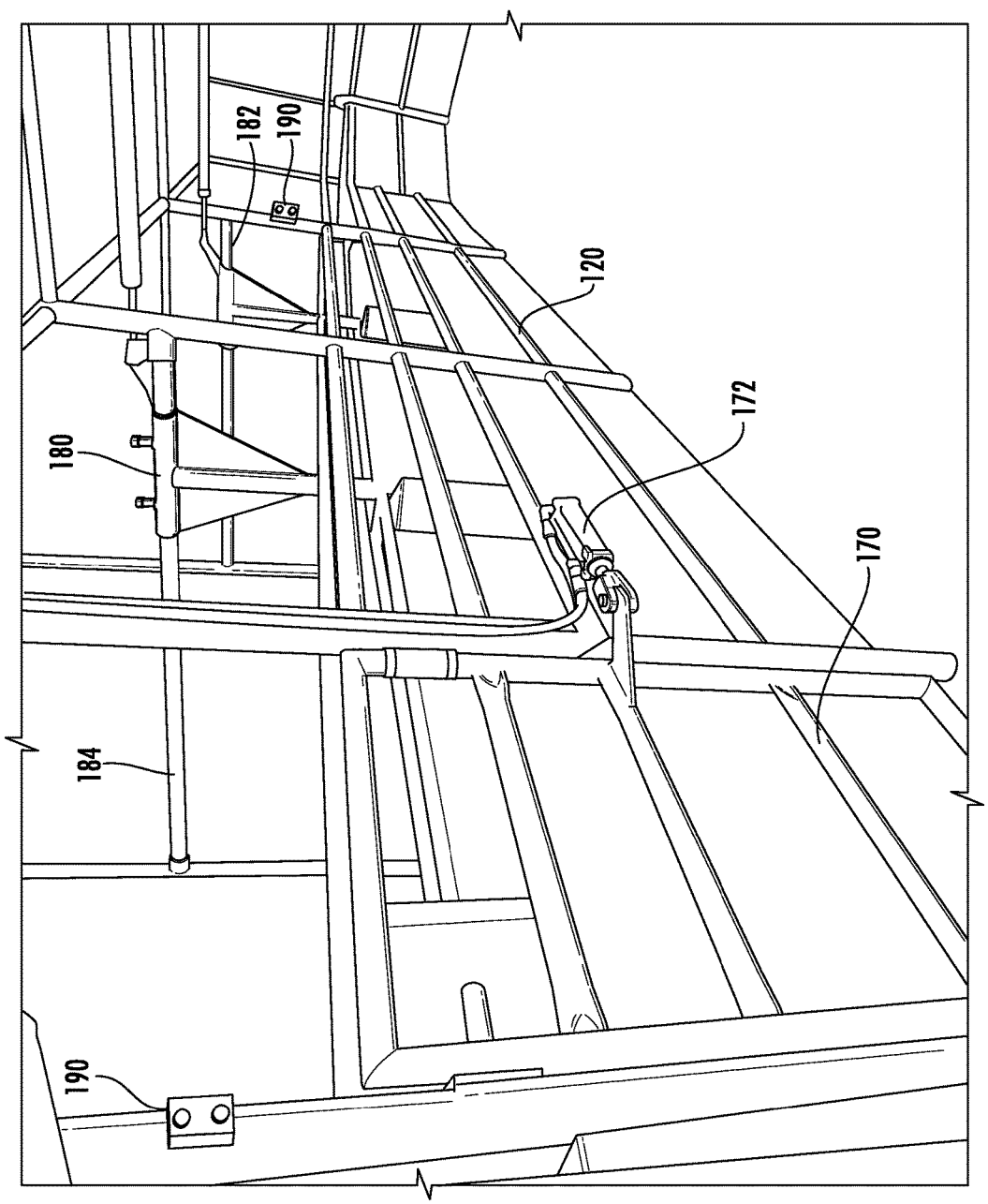
FIG. 12 shows a perspective view of a non-limiting example of a gate assembly of an adjustable crowding alley.

FIG. 12 shows a non-limiting example of a gate 170 positioned near the exit 104. In some implementations, the stationary panel 120 includes a gate 170 positioned near the exit 104. The gate 170 may be a palpation gate or another type of gate positioned to access the animal in or near the destination 80 (e.g., to provide veterinarian access, to administer an injection or other medical treatment, or to provide other persons access to the animal to administer treatments or animal management). Gate 170 may be purely mechanical, or may be power-assisted in opening and closing. In some implementations, gate 170 includes a hydraulic assembly 172 that provides power to swing gate 170 into the alleyway 110 along swing path 171. In some implementations, gate 170 has a length sufficient to bridge the gap between the stationary panel 120 and the adjustable panel 130 when the width 112 of the alleyway 110 ranges anywhere: (a) from the minimum width $W_{min}$ 113 to the operating width $W_{opr}$ 114; or (b) from the minimum width $W_{min}$ 113 to the maximum crowding width $W_{max\_c}$ 115. In some implementations, gate 170 blocks forward motion of animals positioned behind the gate 170 (i.e., between an open gate 170 and the entrance 102).

Where the above examples, embodiments and implementations reference examples, it should be understood by those of ordinary skill in the art that other crowding alleys and manufacturing devices and examples could be intermixed or substituted with those provided. In places where the description above refers to particular embodiments of adjustable crowding alleys and customization methods, it should be readily apparent that a number of modifications may be made without departing from the spirit thereof and that these embodiments and implementations may be applied to other adjustable crowding alley customization technologies as well. Accordingly, the disclosed subject matter is intended to embrace all such alterations, modifications and variations that fall within the spirit and scope of the disclosure and the knowledge of one of ordinary skill in the art.

Any dimensions presented in this document are for example only and not a limitation on the scope of this disclosure. It will be understood that embodiments are not limited to the specific components disclosed herein, as virtually any components consistent with the intended operation of the method or system may be utilized. Accordingly, for example, although particular materials, structures, and couplings may be disclosed, such components may comprise any shape, size, style, type, model, version, class, grade, measurement, concentration, material, weight, quantity, or the like consistent with the intended operation of an adjustable crowding alley 100.

Accordingly, the components defining any adjustable crowding alley embodiment may be formed of any of many different types of materials or combinations thereof that can readily be formed into shaped objects provided that the components selected are consistent with the intended operation of an adjustable crowding alley embodiment. For example, the components can comprise one or more: polymers such as thermoplastics (such as ABS, Fluoropolymers, Polyacetal, Polyamide; Polycarbonate, Polyethylene, Polysulfone, or other similar material), thermosets (such as Epoxy, Phenolic Resin, Polyimide, Polyurethane, Silicone, or other similar material); glasses (such as quartz glass), carbon-fiber, aramid-fiber, any combination thereof, or other similar material; composites; metals, such as zinc, magnesium, titanium, copper, lead, iron, steel, carbon steel, alloy steel, tool steel, stainless steel, brass, tin, antimony, pure aluminum, 1100 aluminum, aluminum alloy, or other similar materials; alloys, such as aluminum alloy, titanium alloy, magnesium alloy, copper alloy, any combination thereof, or other similar materials; and one or more of any of the above with one or more or other similar material.

Various adjustable crowding alley embodiments may be manufactured using conventional procedures as added to and improved upon through the procedures described here. Some components may be manufactured simultaneously and integrally joined with one another, while other components may be purchased pre-manufactured or manufactured separately and then assembled with the integral components.

Accordingly, manufacture of these components separately or simultaneously may involve one or more of extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, or other similar process. If any of the components are manufactured separately, they may then be coupled with one another in any suitable manner, such as with adhesive, a weld, a fastener (e.g., a bolt, a nut, a screw, a nail, a rivet, a pin), wiring, any combination thereof, and/or the like for example, depending on, among other considerations, the particular material forming the components.

Upon reading the teachings of this specification, those with ordinary skill in the art will appreciate that, under certain circumstances, considering issues such as changes in technology, user requirements, etc., a variety of fastening devices may be used to affix, couple, or releasably couple, (as those words are used herein) one or more components of the present disclosure. These fastening devices may comprise one or more of the following: adhesives, belts, bolts, buckles, clasps, latches, locks, screws, snaps, clamps, connectors, couplings, ties, or other fastening means yet to be developed.

Likewise, upon reading the teachings of this specification, those with ordinary skill in the art will appreciate that, under certain circumstances, considering issues such as changes in technology, subject requirements, etc., a variety of fastening devices, such as adhesives, belts, bolts, buckles, clasps, latches, locks, screws, snaps, clamps, connectors, couplings, ties or other fastening means yet to be developed may be used in lieu of—or in conjunction with—any of the fasteners or fastening means discussed above.

It will be understood that the assembly of adjustable crowding alley embodiments are not limited to the specific order of steps as disclosed in this document. Any steps or sequence of steps of the assembly of adjustable crowding alley embodiments indicated herein are given as examples of possible steps or sequence of steps and not as limitations, since various assembly processes and sequences of steps may be used to assemble adjustable crowding alley embodiments.

In places where the description above refers to particular embodiments, it should be readily apparent that a number of modifications may be made without departing from the spirit thereof and that these embodiments may be applied to other embodiments disclosed or undisclosed. The accompanying claims are intended to cover such modifications as would fall within the true spirit and scope of the disclosure set forth in this document. The presently disclosed embodiments are, therefore, to be considered in all respects as illustrative and not restrictive, the scope of the disclosure being indicated by the appended claims rather than the foregoing description. All changes that come within the meaning of and range of equivalency of the claims are intended to be embraced therein.

What is claimed is:

1. An adjustable crowding alley for guiding an animal from an entrance to an exit of the crowding alley, the crowding alley comprising:
    a stationary panel spanning the length of the crowding alley;
    a frame having a rail assembly with two or more rails, each rail being substantially perpendicular to the stationary panel;
    an adjustable panel substantially parallel to the stationary panel and spanning the length of the crowding alley, thereby defining an alleyway having a width W, the adjustable panel hanging from the rail assembly of the frame, wherein the width W increases or decreases as the adjustable panel moves along the two or more rails;
    a backup blocker movably coupled to the adjustable panel, the backup blocker comprising:
        a pivot assembly coupled to the adjustable panel, the pivot assembly capable of rotating around a pivot axis, the backup blocker being operable to rotate around the pivot axis between a protruding position and a collapsed position;
        a first face and a second face coupled at a protruding edge portion, the protruding edge portion protruding into the alleyway from a front side of the adjustable panel by at least 12 cm when the backup blocker is in the protruding position; and
        a spring assembly biased to hold the backup blocker in the protruding position and biased to resist movement of the backup blocker around the pivot axis into the collapsed position, wherein forces applied normal to the first face rotate the backup blocker around the pivot axis but forces applied normal to the second face do not rotate the backup blocker around the pivot axis;
    a control assembly operable to control the movement of the adjustable panel along the two or more rails; and a gate pivotally coupled to the stationary panel proximate the exit of the crowding alley, the gate being substantially parallel to the stationary panel in a closed position and the gate opening into the alleyway towards the adjustable panel in an open position.

2. The adjustable crowding alley of claim 1, wherein the adjustable panel is capable of moving along the two or more rails to vary the width W between a first alleyway width $W_1$ and a third alleyway width $W_3$ with a second alleyway width $W_2$ being between $W_1$ and $W_3$, wherein $W_2$ is from 35 cm to 150 cm.

3. The adjustable crowding alley of claim 1, further comprising:
   a rear side of the adjustable panel opposite the front side of the adjustable panel;
   a first end portion of the adjustable panel proximate the entrance of the crowding alley;
   a second end portion of the adjustable panel proximate the exit of the crowding alley; and
   a first barrier coupled to the first end portion of the adjustable panel, the first barrier protruding away from the rear side of the adjustable panel by a distance between $1.5 \cdot (W_2 - W_1)$ and $1.0 \cdot (W_2 - W_1)$, wherein $W_1$ is from 20 cm to 50 cm and $W_2$ is from 60 cm to 125 cm, the first barrier thereby operable to resist entry of the animal from the entrance of the of the crowding alley to the rear side of the adjustable panel.

4. An adjustable crowding alley for guiding an animal from an entrance to an exit of the crowding alley, the crowding alley comprising:
   a stationary panel spanning the length of the crowding alley;
   an adjustable panel positioned opposite to the stationary panel and spanning a length $L_{total}$ from the entrance to the exit of the crowding alley, thereby defining an alleyway having a width W, the adjustable panel hanging from a rail assembly having two or more rails, wherein the width W increases or decreases as the adjustable panel moves along the two or more rails; and
   a plurality of backup blockers movably coupled to the adjustable panel, each of the backup blockers comprising:
      a pivot assembly coupled to the adjustable panel, the pivot assembly capable of rotating around a pivot axis, the backup blocker being operable to rotate around the pivot axis between a protruding position and a collapsed position;
      a first face and a second face coupled at a protruding edge portion, the protruding edge portion protruding into the alleyway from a front side of the adjustable panel by at least 12 cm when the backup blocker is in the protruding position; and
      a spring assembly biased to hold the backup blocker in the protruding position and biased to resist movement of the backup blocker around the pivot axis into the collapsed position, wherein forces applied normal to the first face rotate the backup blocker around the pivot axis but forces applied normal to the second face do not rotate the backup blocker around the pivot axis;
   wherein the distance between adjacent protruding edge portions of each of the plurality of backup blockers is a first length $L_1$.

5. The adjustable crowding alley of claim 4, wherein the first length $L_1$ is between 150 cm and 300 cm.

6. The adjustable crowding alley of claim 4, wherein:
   the first length $L_1$ is between 150 cm and 300 cm and the plurality of backup blockers consists of two to five backup blockers; or
   the first length $L_1$ is between 100 cm and 170 cm and the plurality of backup blockers consists of two to eight backup blockers.

7. The adjustable crowding alley of claim 4, further comprising:
   a gate pivotally coupled to the stationary panel proximate the exit of the crowding alley, the gate being substantially parallel to the stationary panel in a closed position and the gate opening into the alleyway towards the adjustable panel in an open position.

8. The adjustable crowding alley of claim 4, further comprising:
   a first control assembly operable to hydraulically control the movement of the adjustable panel along the two or more rails, the first control assembly being positioned within 200 cm of the entrance of the crowing alley; and
   a second control assembly operable to hydraulically control the movement of the adjustable panel along the two or more rails, the second control assembly being positioned within 200 cm of the exit of the crowing alley, wherein the same movement of the adjustable panel is controlled by at least one control member of the first control assembly and by at least one control member of the second control assembly.

9. The adjustable crowding alley of claim 4, wherein the length $L_{total}$ is between 7.5 and 12 m.

10. The adjustable crowding alley of claim 4, wherein the adjustable panel is capable of moving along the two or more rails to vary the width W between a first alleyway width $W_1$ and a third alleyway width $W_3$ with a second alleyway width $W_2$ being between $W_1$ and $W_3$, wherein $W_2$ is from 36 cm to 150 cm.

11. The adjustable crowding alley of claim 10, further comprising:
   a rear side of the adjustable panel opposite the front side of the adjustable panel;
   a first end portion of the adjustable panel proximate the entrance of the crowding alley;
   a second end portion of the adjustable panel proximate the exit of the crowding alley; and
   a first barrier coupled to the first end portion of the adjustable panel, the first barrier protruding away from the rear side of the adjustable panel by a distance between $1.5 \cdot (W_2 - W_1)$ and $1.0 \cdot (W_2 - W_1)$, wherein $W_1$ is from 20 cm to 50 cm and $W_2$ is from 60 cm to 125 cm, the first barrier thereby operable to resist entry of the animal from the entrance of the of the crowding alley to the rear side of the adjustable panel.

12. The adjustable crowding alley of claim 10, wherein $W_3$ is at least 60 cm wider than $W_2$.

13. An adjustable crowding alley for guiding an animal from an entrance to an exit of the crowding alley, the crowding alley comprising:
   an adjustable panel spanning a length $L_{total}$ from the entrance to the exit of the crowding alley, the adjustable panel being capable of being positioned substantially parallel to a stationary panel and thereby defining an alleyway having a width W, the adjustable panel hanging from a rail assembly having two or more rails, wherein the width W increases or decreases as the adjustable panel moves along the two or more rails; and a plurality of backup blockers movably coupled to the adjustable panel, each of the backup blockers comprising:
    a pivot assembly coupled to the adjustable panel, the pivot assembly capable of rotating around a pivot axis, the backup blocker being operable to rotate around the pivot axis between a protruding position and a collapsed position;
    a first face and a second face coupled at a protruding edge portion, the protruding edge portion protruding into the alleyway from a front side of the adjustable panel by at least 12 cm when the backup blocker is in the protruding position; and
    a spring assembly biased to hold the backup blocker in the protruding position and biased to resist movement of the backup blocker around the pivot axis into the collapsed position, wherein forces applied normal to the first face rotate the backup blocker around the pivot axis but forces applied normal to the second face do not rotate the backup blocker around the pivot axis;
wherein the distance between adjacent protruding edge portions of each of the plurality of backup blockers is a first length $L_1$ measuring at least 100 cm.

14. The adjustable crowding alley of claim 13, wherein the adjustable panel is capable of moving along the two or more rails to vary the width W between a first alleyway width $W_1$ and a third alleyway width $W_3$ with a second alleyway width $W_2$ being between $W_1$ and $W_3$.

15. The adjustable crowding alley of claim 14, wherein $W_3$ is at least 60 cm wider than $W_2$.

16. The adjustable crowding alley of claim 15, wherein the first length $L_1$ is between 150 cm and 300 cm.

17. The adjustable crowding alley of claim 16, wherein:
    the first length $L_1$ is between 150 cm and 300 cm and the plurality of backup blockers consists of two to five backup blockers; or
    the first length $L_1$ is between 100 cm and 170 cm and the plurality of backup blockers consists of two to eight backup blockers.

18. The adjustable crowding alley of claim 14, further comprising:
    a rear side of the adjustable panel opposite the front side of the adjustable panel;
    a first end portion of the adjustable panel proximate the entrance of the crowding alley;
    a second end portion of the adjustable panel proximate the exit of the crowding alley; and
    a first barrier coupled to the first end portion of the adjustable panel, the first barrier protruding away from the rear side of the adjustable panel by a distance between $1.5 \cdot (W_2-W_1)$ and $1.0 \cdot (W_2-W_1)$, wherein $W_1$ is from 20 cm to 50 cm and $W_2$ is from 60 cm to 125 cm, the first barrier thereby operable to resist entry of the animal from the entrance of the of the crowding alley to the rear side of the adjustable panel.

19. The adjustable crowding alley of claim 13, further comprising:
    a stationary panel spanning the length of the crowding alley, the stationary panel having a gate proximate the exit of the crowding alley, wherein the gate is a palpation gate.

20. The adjustable crowding alley of claim 13, further comprising:
    a first control assembly operable to hydraulically control the movement of the adjustable panel along the two or more rails, the first control assembly being positioned within 200 cm of the entrance of the crowing alley; and
    a second control assembly operable to hydraulically control the movement of the adjustable panel along the two or more rails, the second control assembly being positioned within 200 cm of the exit of the crowing alley, wherein the same movement of the adjustable panel is controlled by at least one control member of the first control assembly and by at least one control member of the second control assembly.

* * * * *